Figure 1:
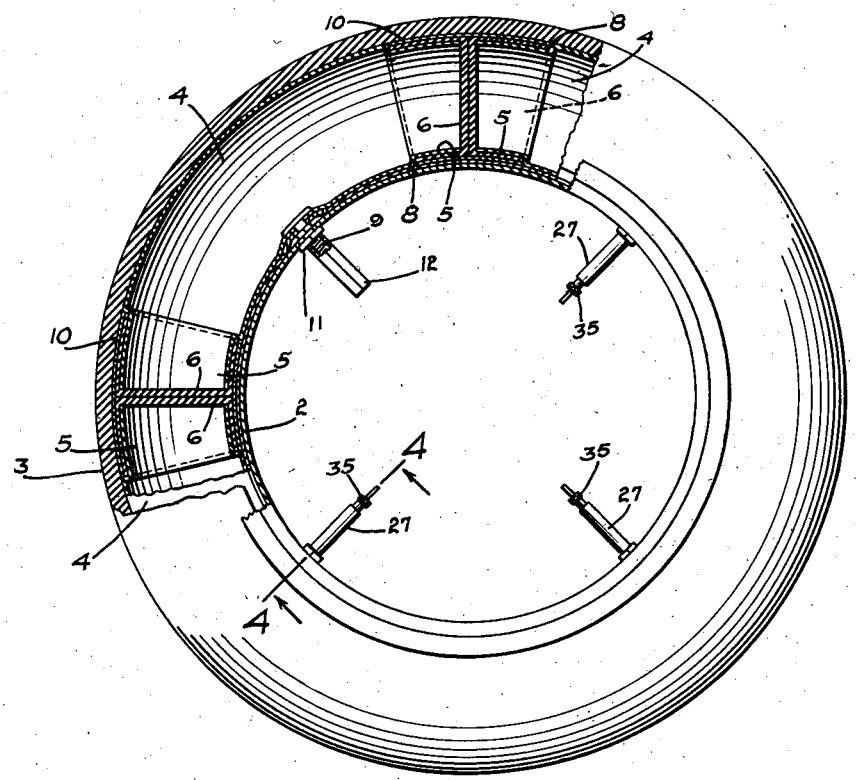

July 17, 1934.     W. P. BROWN     1,966,428
VALVE FOR PNEUMATIC TIRES
Filed Sept. 18, 1931

INVENTOR
WILLIAM P. BROWN
By Paul, Paul Kilroy
ATTORNEYS

Patented July 17, 1934

1,966,428

UNITED STATES PATENT OFFICE 1,966,428

VALVE FOR PNEUMATIC TIRES

William Parker Brown, Minneapolis, Minn.

Application September 18, 1931, Serial No. 563,575

1 Claim. (Cl. 152—12)

This invention relates to new and useful improvements in multi-cellular pneumatic tires, and more particularly to a novel valve structure adapted for use in connection with such tires.

An object of the invention is to provide a multi-cellular pneumatic tire comprising a plurality of independent air cells each provided with a novel valve so constructed that the tire may readily be mounted upon or removed from a rim or wheel, when it becomes necessary to change tires, as when one is punctured.

A further object is to provide an inner tube comprising a plurality of independent segmental sections each defining an air chamber, and each of said sections being provided with a novel valve structure whereby said members are inflated independently of each other, and said valve structures being designed to facilitate mounting the tire upon or removing it from a rim or wheel, said sections being inserted into the casing with their ends abuttingly engaged so that when they are inflated within the casing, they will form in effect, a continuous or endless tube which, under ordinary operating conditions, will function as an ordinary inner tube, said sectional tube, however, being desirable over ordinary tubes in that should the casing become damaged, as in the case of a blow-out, only one of said air chambers may become deflated, whereby the driver may keep the car under control, even though driving at high speed.

A further object of the invention, therefore, is to provide a safety tire particularly adapted for high speed driving, and comprising a casing having an inner tube therein composed of a plurality of independent air chambers provided with separate valves for inflating them, each of said valves comprising two parts, one of which is permanently secured to its respective tube section and having a check valve therein, and the other part of said valve being detachably secured to said first mentioned part whereby it may readily be detached therefrom to facilitate mounting the tire upon or removing it from the rim or wheel, said detachable part preferably having a check valve therein, and being of a size and shape whereby it will be so positioned upon the wheel as to permit convenient attachment thereto of the usual air hose.

Other objects of the invention will appear from the following description and accompanying drawing and will be pointed out in the annexed claim.

In the accompanying drawing, there has been disclosed a structure designed to carry out the various objects of the invention, but it is to be understood that the invention is not confined to the exact features shown as various changes may be made within the scope of the claims which follow.

Figure 2:
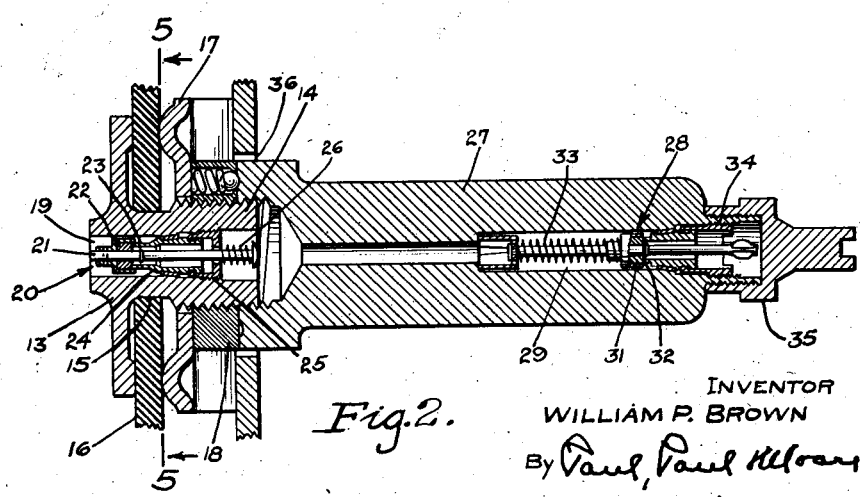

In the drawing:

Figure 1 is a side elevation of a pneumatic tire showing the usual casing mounted upon the rim and my improved inner tube inserted in the casing; and Figure 2 is an enlarged detail sectional view on the line 4—4 of Figure 1 showing the novel valve construction provided for each tube section.

In the selected embodiment of the invention here shown, there is illustrated in Figure 1, for purposes of disclosure, a tire rim 2 of ordinary construction, having a casing 3 mounted thereon and provided with a multi-cellular inner tube so constructed that if a portion of its wall is punctured, the entire tube will not become deflated. The inner tube herein disclosed may consist of a plurality of segmental sections 4, having reduced end portions 5 over which suitable caps or boots 6 are fitted and secured in leak-proof relation, as shown in Figure 1. The tube may be formed in one continuous section. The caps 6 preferably abuttingly engage the shoulders 8 provided at the ends of the sections 4 so that the diameters of the caps 6 will be substantially flush with the peripheries of the bodies of the tube sections.

Each section 4 is provided with a suitable air valve whereby the chambers defined by the walls of said sections and said caps may be inflated independently of each other. In Figure 1, I have shown a tire comprising four inner tube sections, but it is to be understood that the number of sections used may be varied as desired. When four segmental sections are used as here shown, one of the sections is provided with an ordinary tire valve 9 secured to the wall of its section in the usual well-known manner, and provided with a lock nut 11 received in threaded engagement with the valve stem whereby the valve stem may pass through the rim to prevent slippage of the tube section within the casing. When the valve stem is secured to the tire rim 2, as shown in Figure 1, the valve stem may be enclosed by means of a valve cap 12.

When a tube such as herein disclosed is used in connection with a standard automobile rim or wheel, all but one of the tube sections 4 are provided with valve structure such, for example, as disclosed in Figure 2, to facilitate mounting the tire upon or removing it from the rim or wheel. The novel valve structure herein shown comprises a flanged member 13 having a threaded portion 14 inserted through an opening 15 provided in the inner wall 16 of the tube section, as shown in Figure 2. A suitable clamping member 17 is fitted over the threaded portion 14 and cooperates with the flange on the inner end of the member 13 to clampingly engage the wall 16 of the tube section to secure the member 13 thereto. The clamping member 17 is moved into clamping engagement with the tube wall 16 by means of a nut 18 received in threaded engagement with the threaded portion 14 of the member.

The member 13 has a bore 19 adapted to receive a suitable check valve, indicated generally by the numeral 20. This check valve comprises a stem 21 having a valve head 22 adapted to engage a seat 23 provided at one end of a valve cage 24, secured within the bore 19 by such means as threads 25. A suitable spring 26 normally holds the valve head 22 in engagement with the seat 23. The valve 20 may readily be removed from the bore 21 by rotation of the valve cage 24, in the same manner as the core of an ordinary valve.

The threaded portion 14 of the member 13 extends beyond the outer face of the nut 18, and is adapted to receive a suitable valve supporting member 27, as shown in Figure 2. The member 27 has a bore 29 in which is mounted a valve core 28 such as is commonly used in connection with ordinary valve stems. This valve core comprises the usual valve head 31, seat 32, and spring 33 which operates to normally retain the head 31 in valve closing position. A threaded extension 34 is provided upon the member 27 adapted to receive a valve cap 35, as shown.

When mounting the tire upon the rim or wheel, the valve supporting members 27 are preferably detached from the threaded portions 14, after which the tire may be mounted upon or removed from a rim or wheel in the same manner as an ordinary tire. When the tire has been mounted and secured to the rim or wheel, the valve members 27 are secured to their respective valve portions 14 in the manner shown in Figure 1, after which each individual air chamber may be inflated independently of the others, as will readily be understood by reference to Figures 1 and 2. When the valve members 27 are detached from the threaded extensions 14, the check valves 20 function to retain the air in their respective chambers. A plurality of suitable openings 36 are, of course, provided in the tire rim or wheel adapted to receive the valve members 27.

Because of each section of the tire being provided with an independent valve, such as shown in Figures 1 and 2 and further, because the sections are not in communication with each other, should one of the sections become punctured, the remaining sections of the tire may expand sufficiently circumferentially of the wheel to substantially take up the place occupied by the punctured section, whereby the car may be temporarily operated without danger of throwing the tire. The operation of mounting the tire upon the rim or wheel or removing it therefrom is also simplified, as a result of certain of the valves being constructed of two parts, as shown in Figure 2, whereby the outer parts 27 thereof may readily be detached from the portions 14 to permit the latter to be disengaged from the tire rim.

I claim as my invention:

In a valve adapted for use in connection with a pneumatic tire, a threaded member mounted in a wall of the tire and having a flange at one end engaging one side of said wall, an apertured member engaging the opposite side of the tire wall, a nut engaged with said threaded member for moving said apertured member in a direction towards said flange to secure the wall of the tire between said apertured member and flange in leak-proof relation, said threaded member having an air passage therethrough provided with a check valve, an elongated stem received in threaded engagement with said threaded member and having an air passage extending longitudinally therethrough and communicating with the passage in said threaded member, a valve core supported in the outer end of said stem, means whereby an air hose may be attached to said stem to supply air to the tire, said check valve preventing the escape of air from the tire when said stem is detached from said threaded member, and means for locking said stem against relative rotation upon said threaded member to prevent the stem from accidentally becoming detached therefrom.

WILLIAM PARKER BROWN.